US011765615B2

(12) United States Patent
Jactat (10) Patent No.: US 11,765,615 B2
(45) Date of Patent: Sep. 19, 2023

(54) BEARER MAPPING IN A WIRELESS COMMUNICATIONS NETWORK

(71) Applicant: JRD Communication (SHENZHEN) LTD., Guangdong (CN)

(72) Inventor: Caroline Jactat, Nanterre (FR)

(73) Assignee: JRD COMMUNICATION (SHENZHEN) LTD., Guangdong (CN)

( * ) Notice: Subject to any disclaimer, the term of this patent is extended or adjusted under 35 U.S.C. 154(b) by 0 days.

(21) Appl. No.: 16/957,374

(22) PCT Filed: Oct. 25, 2019

(86) PCT No.: PCT/CN2019/113457
§ 371 (c)(1),
(2) Date: Jun. 23, 2020

(87) PCT Pub. No.: WO2020/088377
PCT Pub. Date: May 7, 2020

(65) Prior Publication Data
US 2021/0360466 A1  Nov. 18, 2021

(30) Foreign Application Priority Data
Oct. 31, 2018 (GB) ..................................... 1817839

(51) Int. Cl.
*H04W 88/14* (2009.01)
*H04W 28/02* (2009.01)
*H04W 76/12* (2018.01)

(52) U.S. Cl.
CPC ... *H04W 28/0263* (2013.01); *H04W 28/0268* (2013.01); *H04W 76/12* (2018.02); *H04W 88/14* (2013.01)

(58) Field of Classification Search
CPC . H04W 76/12; H04W 28/0263; H04W 88/14; H04W 76/11; H04W 28/0268
See application file for complete search history.

(56) References Cited

U.S. PATENT DOCUMENTS

2015/0110048 A1* 4/2015 Damnjanovic ....... H04W 76/16
370/329
2017/0048857 A1* 2/2017 Vajapeyam ....... H04W 28/0273
(Continued)

FOREIGN PATENT DOCUMENTS

| EP | 3629505 A1 * | 4/2020 | ........... H04L 1/1685 |
| WO | 20190216670 A1 | 11/2019 | |
| WO | 20190216717 A1 | 11/2019 | |

OTHER PUBLICATIONS

Huawei, "QoS Management of IAB nodes", 3GPP TSG-RAN WG3#101, R3-184867, Aug. 2018.
(Continued)

*Primary Examiner* — Syed Ali
(74) *Attorney, Agent, or Firm* — PV IP PC; Wei Te Chung; Zhigang MA (57) ABSTRACT

A method of bearer mapping is provided in a wireless communications network, the wireless communications network comprising a plurality of nodes which support integrated wireless access and backhaul between a core network and user equipment. The method comprises at at least some of the nodes of the network preconfiguring the node with a bearer mapping policy by modifying a protocol layer of the node to define a plurality of sets of permitted values of communication identifiers and associate each set of values of the communication identifiers with a logical channel identifier and at least one quality of service parameter, and receiving at least one signal at the node comprising a plurality of protocol data units, and for each protocol data unit, determining the set of values of the communication identifiers from the protocol data unit, applying the bearer mapping policy to determine the logical channel identifier and the at least one quality of service parameter associated with the set of values of the communication identifiers of the protocol data unit and mapping the protocol data unit to a (Continued)

logical channel having the logical channel identifier and applying the at least one quality of service parameter to the logical channel FIG. 6 to be published with the abstract.

8 Claims, 7 Drawing Sheets

(56) References Cited

U.S. PATENT DOCUMENTS

| | | | |
|---|---|---|---|
| 2017/0303287 A1* | 10/2017 | Yu | H04L 67/146 |
| 2019/0230572 A1* | 7/2019 | Cheng | H04L 47/24 |
| 2019/0274064 A1* | 9/2019 | Chapman | H04W 72/52 |
| 2019/0289492 A1* | 9/2019 | Hampel | H04W 40/22 |

OTHER PUBLICATIONS

Huawei, "UP protocol design for architecture 1a", 3GPP TSG-RAN WG3 Meeting Ad Hoc, R3-183824, Jul. 1, 2018.

Zte, "Discussion and IAB architectures", 3GPP TSG-RAN WG3 Meeting #99bis, R3-181829, Apr. 15, 2018.

TCL Communication, "QoS and route selection for IAB", 3GPP TSG-RAN WG2 NR AH1807 Meeting, R2-1810114, Jul. 6, 2018.

Catt, "User Plane Considerations for L2 IAB Architectures", 3GPP TSG-RAN WG2 AH1807, R2-1809818, Jul. 1, 2018.

3gpp.org. "3rd Generation Partnership Project; Technical Specification Group Radio Access Network; Study on Integrated Access and Backhaul, (Release 15)", 3GPP TR 38.874, V0.6.0, Nov. 1, 2018.

3gpp.org. "3rd Generation Partnership Project; Technical Specification Group Radio Access Network; Study on Integrated Access and Backhaul, (Release 15)", 3GPP TR 38.874, V0.5.0, Sep. 26, 2018.

Huawei, et al., "Logical channel ID allocation for PDCP duplication", 3GPP TSG-RAN WG2 #101bis, R2-1804663, Apr. 20,2018.

Qualcomm Inc., "Email discussion on unified design for IAB arch 1a", 3GPP TSG-RAN WG2 Meeting #103bis, R2-1815930, Oct. 12, 2018.

Huawei, "IAB bearer mapping decisions", 3GPP TSG-RAN WG2#101bis, R3-185999, Sep. 29, 2018.

Catt, "User Plane Considerations for L2 IAB Architectures", 3GPP TSG-RAN WG2#102, R2-1807555, May 11, 2018.

Huawei, "Adaptation layer design", 3GPP TSG-RAN WG3 #Ad Hoc 1807, R3-183784, Jun. 26, 2018.

* cited by examiner

BEARER MAPPING IN A WIRELESS COMMUNICATIONS NETWORK

CROSS-REFERENCE TO RELATED APPLICATIONS

This application is a National Stage of International patent application PCT/CN2019/113457, filed on Oct. 25, 2019, which claims priority to foreign Great Britain patent application No. GB 1817839.2, filed on Oct. 31, 2018, the disclosures of which are incorporated by reference in their entirety.

TECHNICAL FIELD

The following disclosure relates to bearer mapping in a wireless communications network.

BACKGROUND

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards a broadband and mobile system.

In cellular wireless communication systems User Equipment (UE) is connected by a wireless link to a Radio Access Network (RAN). The RAN comprises a set of base stations which provide wireless links to the UEs located in cells covered by the base station, and an interface to a Core Network (CN) which provides overall network control. As will be appreciated the RAN and CN each conduct respective functions in relation to the overall network. For convenience the term cellular network will be used to refer to the combined RAN & CN, and it will be understood that the term is used to refer to the respective system for performing the disclosed function.

The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB. NR is proposed to utilise an Orthogonal Frequency Division Multiplexed (OFDM) physical transmission format.

In wireless communications networks base stations provide wireless coverage to the UE. This is called access. In addition, traffic is carried between base stations and the CN, or between base stations in a network using relays. This is called backhaul. The backhaul can use wireless resources. One area of development in wireless communications networks is Integrated Access and Backhaul (IAB). In IAB wireless channel resources are shared between wireless access and wireless backhaul. Due to expected larger bandwidth availability along with native deployment of massive MIMO or multi-beam systems, NR creates an opportunity to deploy integrated access and backhaul links for providing access to UEs.

Figure 1:
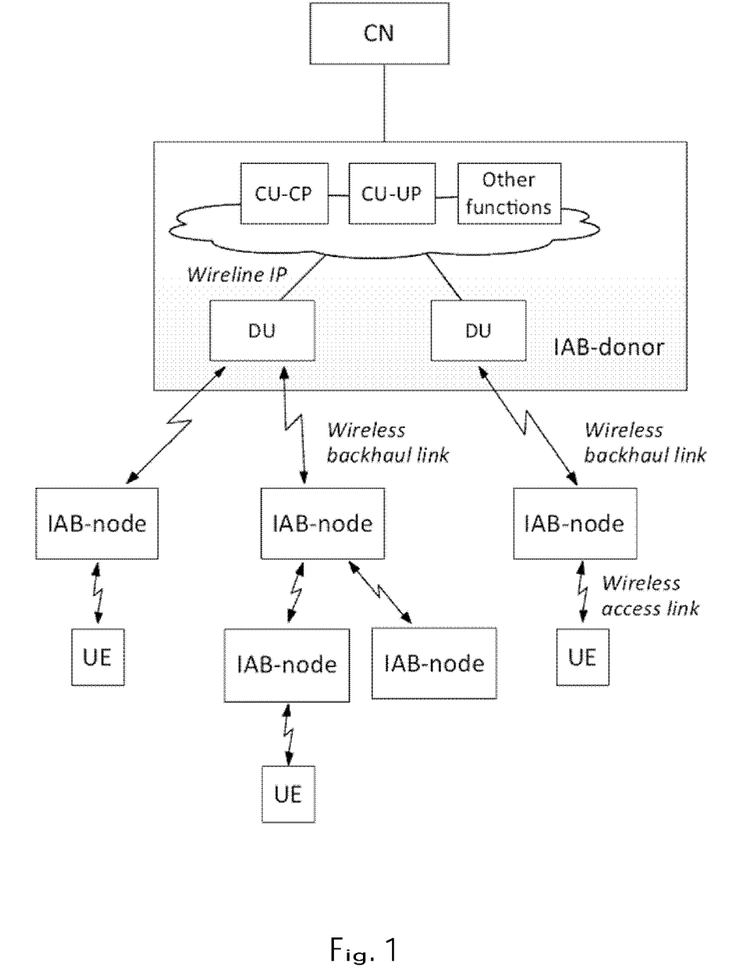
FIG. 1 shows an example of an IAB network.
Figure 2:
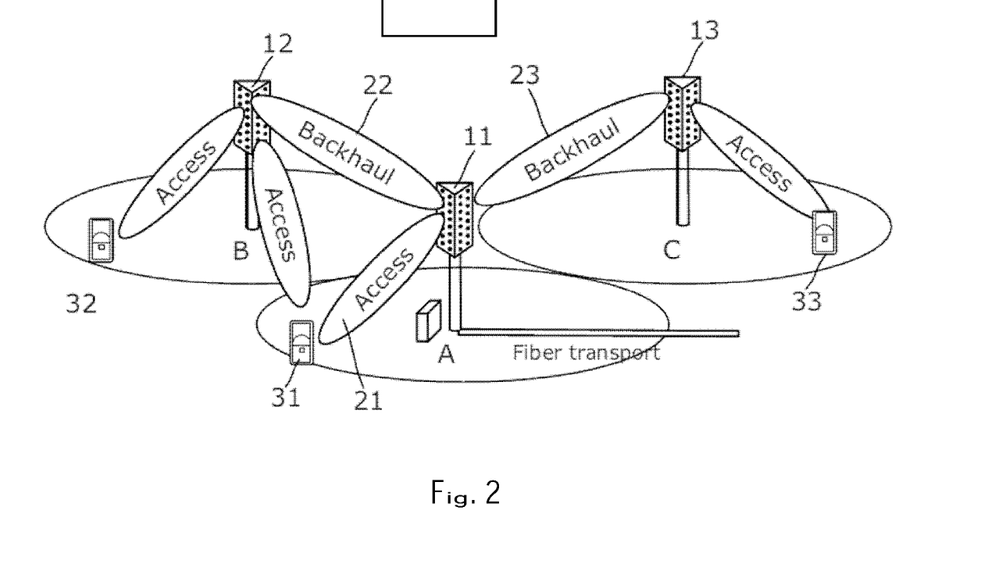
FIG. 2 shows an example of integrated access and backhaul links of an IAB network.

FIG. 1 shows an IAB architecture. The system comprises a plurality of wireless or Radio Access Network (RAN) nodes. An IAB donor node interfaces to the core network (CN) and interfaces to the IAB nodes by respective wireless backhaul links. Each nodes may support access and backhaul links. The central IAB-node serves as a relay node and supports backhaul to the two lower IAB-nodes. The UEs are served directly by wireless access links to the IAB-nodes. Each of the IAB nodes may multiplex access and backhaul links in one or more of time, frequency and space, e.g. beam-based operation (see FIG. 2).

A plurality of RAN nodes can be involved in a route between a UE and the CN. In FIG. 1, the lowermost UE is connected to the CN by a route comprising an access link to a first IAB-node, a backhaul link from the first IAB node to a second IAB node and a backhaul link from the second IAB node to the IAB donor node. It is important to maintain the quality of service (QoS) of transport of communications in each hop.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method is proposed of bearer mapping in a wireless communications network, the wireless communications network comprising a plurality of nodes which support integrated wireless access and backhaul between a core network and user equipment, the method comprising at at least some of the nodes of the network preconfiguring the node with a bearer mapping policy by modifying a protocol layer of the node to define a plurality of sets of permitted values of communication identifiers and associate each set of values of the communication identifiers with a logical channel identifier and at least one quality of service parameter, and receiving at least one signal at the node comprising a plurality of protocol data units, and for each protocol data unit, determining the set of values of the communication identifiers from the protocol data unit, applying the bearer mapping policy to determine the logical channel identifier and the at least one quality of service parameter associated with the set of values of the communication identifiers of the protocol data unit and mapping the protocol data unit to a logical channel having the logical channel identifier and applying the at least one quality of service parameter to the logical channel.

Preconfiguring the node may be controlled by a donor node of the network.

Modifying the protocol layer of the node may comprise modifying an RLC adaptation layer of the node.

The communication identifiers may comprise a communication type identifier signifying a control data communication or a user data communication, a protocol identifier signifying a protocol of the communication, a general packet radio service tunneling protocol (GTP) tunnel identifier signifying a tunnel endpoint in a receiving GTP protocol entity, a UE identifier and a radio bearer identifier.

The communication identifiers may be aggregated to reduce overhead.

The QoS parameter may comprise any of a Priority parameter, a Prioritized Bit Rate parameter, a Bucket Size Duration parameter.

Determining the set of values of the communication identifiers from the protocol data unit may comprise reading the set of values of the communication identifiers from a header of the protocol data unit.

An IAB node is proposed which is configured to perform the method of the invention. The IAB node may comprise any of an interim IAB node, an access IAB node.

An IAB donor node is proposed which is configured to perform the method of the invention.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION OF THE PREFERRED EMBODIMENTS

Those skilled in the art will recognise and appreciate that the specifics of the examples described are merely illustrative of some embodiments and that the teachings set forth herein are applicable in a variety of alternative settings.

In IAB networks, the IAB donor node may be treated as a single logical node that comprises a set of functions such as gNB-DU, gNB-CU-CP, gNB-CU-UP and potentially other functions. In a deployment, the IAB donor node can be split according to these functions, which can be either be collocated or non-collocated as allowed by the NG-RAN architecture.

IAB strives to reuse existing functions and interfaces defined for access.

In particular, Mobile-Termination (MT), gNB-DU, gNB-CU, UPF, AMF and SMF functions as well as the corresponding interfaces, NR Uu (between MT and gNB), F1 (between two IAB nodes or between an IAB node and an IAB donor), NG, X2 and N4 are used as baselines for IAB architectures.

The MT function has been defined as a component of the Mobile Equipment. MT is referred to as a function residing on an IAB node that terminates the radio interface layers of the backhaul interface towards the IAB donor or other IAB nodes.

Figure 3:
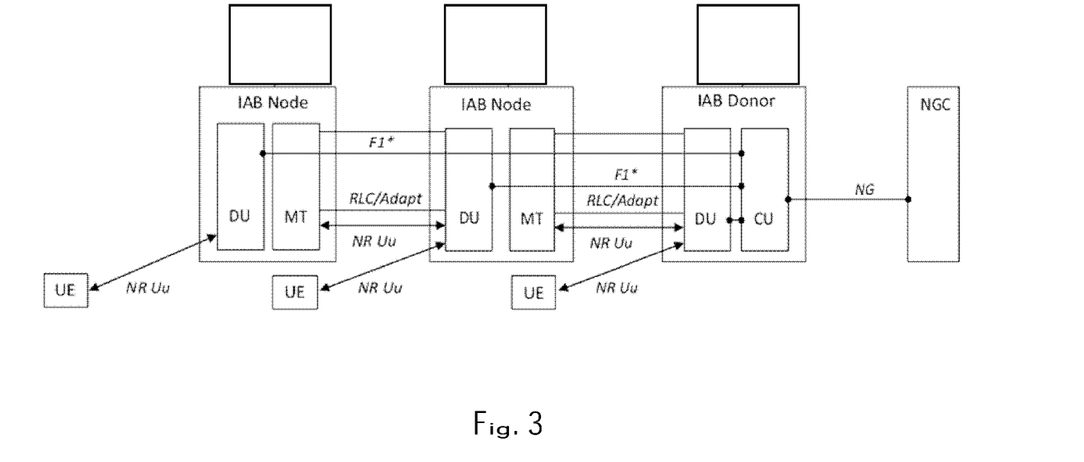
FIG. 3 shows an example of an IAB architecture which uses multi-hop forwarding between UEs and the IAB donor.

An example of an IAB architecture which uses multi-hop forwarding between UEs and the IAB donor is shown in FIG. 3. In this architecture, each IAB node comprises a distributed unit (DU) and an MT. Via the MT, an IAB-node connects to an upstream IAB-node or the IAB-donor. Via the DU, using the "RLC/Adapt" adaptation layer, an IAB-node establishes Radio Link Control (RLC) channels to UEs and to MTs of downstream IAB-nodes. RLC Protocol Data Units (PDUs) are conveyed between IAB nodes until the IAB donor, where the PDCP PDU/SDU is recomposed and forwarded to the NGC.

QoS for the NR model is based on QoS flows. A QoS flow consists of a set of data subject to the same traffic forwarding treatment (e.g. scheduling, admission threshold, etc.). A QoS flow is the finest granularity of QoS differentiation in a PDU session. For transport of control data in the control plane or transport of user data in the user plane, bearer mapping is needed between the inbound data path and the outbound data path in an IAB node to meet QoS requirements. Two bearer mapping options have been considered.

Figure 4:
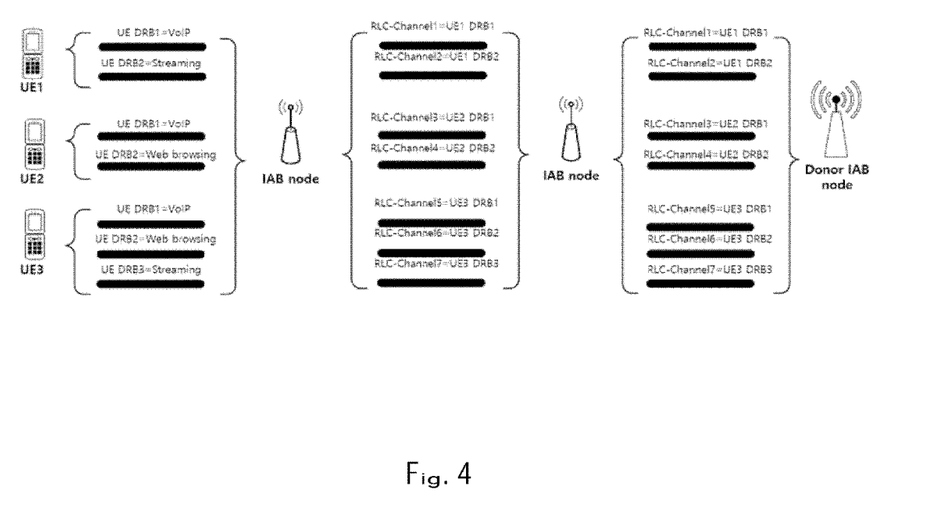
FIG. 4 shows a first prior art bearer mapping option.

Bearer Mapping Option 1: 1-to-1 mapping (see FIG. 4).

In this mapping option, each UE Data Radio Bearer (DRB) is mapped onto a separate backhaul (BH) RLC channel. Further, each BH RLC channel is mapped onto a separate BH RLC channel in the next hop. The number of established BH RLC-Channels is equal to the number of established UE DRBs.

Since the IAB node just relays a data block between UE DRBs and BH RLC-Channels, there is no need to multiplex UE DRBs, and no need to identify the data block. There is one RLC channel using the same ID per QoS based application (e.g. VoIP, Streaming) along the route from a UE towards the IAB donor node.

Bearer Mapping Option 2: Many-to-one (n-to-1) mapping (see FIG. 5).

Figure 5:
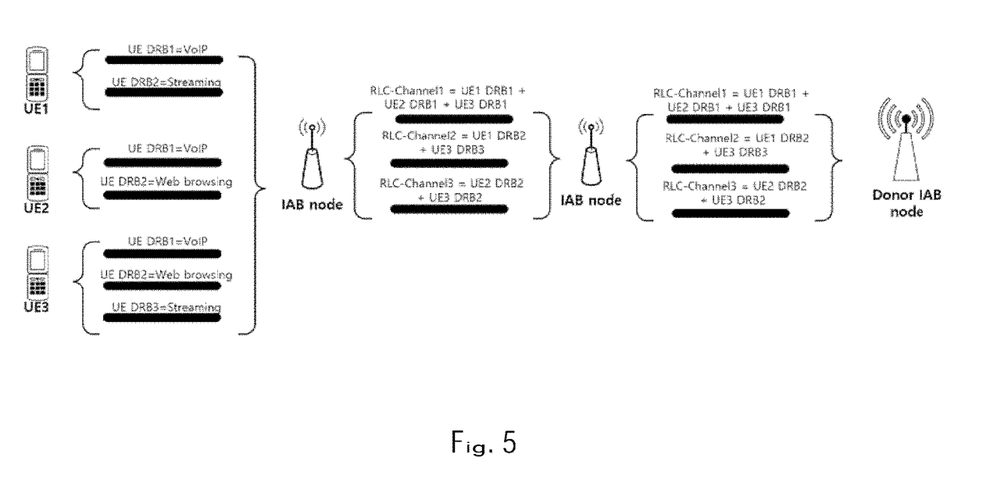
FIG. 5 shows a second prior art bearer mapping option.

For the many-to-one mapping, the IAB node establishes BH RLC-Channels based on network implementation specific parameters, such as the QoS profile. Other information such as hop count could also be considered. The IAB node can multiplex DRBs or QoS flows with similar QoS characteristics into a single BH RLC-Channel even in the case where they belong to different UEs. One RLC channel using the same ID per QoS based application (e.g. VoIP, Streaming) may be provided along the route from several UEs towards the IAB donor node. In other words, the same QoS based application of several UEs are multiplexed onto the same RLC channel. Further, each BH RLC-channel may be mapped onto different BH RLC-Channels according to QoS profiles and/or other information in the next hop.

Since the BH RLC-Channel is aggregating data from multiple bearers, UEs or IAB nodes, each data block transmitted in the BH RLC-Channel may need to contain an identifier of the UE, IAB node, and/or DRB it belongs to.

The mapping as well as the QoS scheduling in the intermediate nodes can be dynamically updated in specific network implementations based on aspects such as changing radio conditions, load conditions (e.g. number of connected users), achievable packet delay budgets, etc. The intermediate nodes could get the information required via the adaptation layer header or direct CU signalling.

The 1-to-1 bearer mapping option allows for a finer granularity for the QoS (given 1-to-1 mapping), but at the expense of increased RLC (logical) channel ID space. The n-to-1 bearer mapping option does not allow a finer granularity for the QoS requirements if the logical channel ID space is not increased. No unified design solution exists for 1-to-1 and n-to-1 bearer mapping in an IAB network which satisfies the QoS requirements whilst not increasing the logical channel identity space.

A method is proposed of bearer mapping in a wireless communications network, the wireless communications network comprising a plurality of nodes which support integrated wireless access and backhaul between a core network and user equipment, the method comprising at at least some of the nodes of the network preconfiguring the node with a bearer mapping policy by modifying a protocol layer of the node to define a plurality of sets of permitted values of communication identifiers and associate each set of values of the communication identifiers with a logical channel identifier and at least one quality of service parameter, and receiving at least one signal at the node comprising a plurality of protocol data units, and for each protocol data unit, determining the set of values of the communication identifiers from the protocol data unit, applying the bearer mapping policy to determine the logical channel identifier and the at least one quality of service parameter associated with the set of values of the communication identifiers of the protocol data unit and mapping the protocol data unit to a logical channel having the logical channel identifier and applying the at least one quality of service parameter to the logical channel.

Preconfiguring the node is controlled by a donor node of the network.

Modifying the protocol layer of the node comprises modifying an RLC adaptation protocol layer of the node.

The communication identifiers comprise a communication type identifier signifying a control data communication or a user data communication, a protocol identifier signifying a protocol used by the communication, a GTP tunnel identifier signifying a tunnel endpoint in a receiving GTP protocol entity, a UE identifier and a radio bearer identifier.

A GTP protocol layer of the node is used to convey user data in the user plane and control data in the control plane.

The communication identifiers may be aggregated to reduce overhead. The aggregation may comprise hashing. The aggregation may be carried out by a GTP protocol layer of the node.

The QoS parameter can comprise any of a Priority parameter, a Prioritized Bit Rate parameter, a Bucket Size Duration parameter. In cases where the QoS parameter(s) apply to a UE identifier, the required QoS would be met on the UE basis. In cases where the QoS parameter(s) apply to a GTP tunnel identifier or a radio bearer identifier, the required QoS would be met on the logical channel basis.

Determining the set of values of the communication identifiers from the PDU comprises reading the set of values of the communication identifiers from a header of the PDU.

Figure 6:
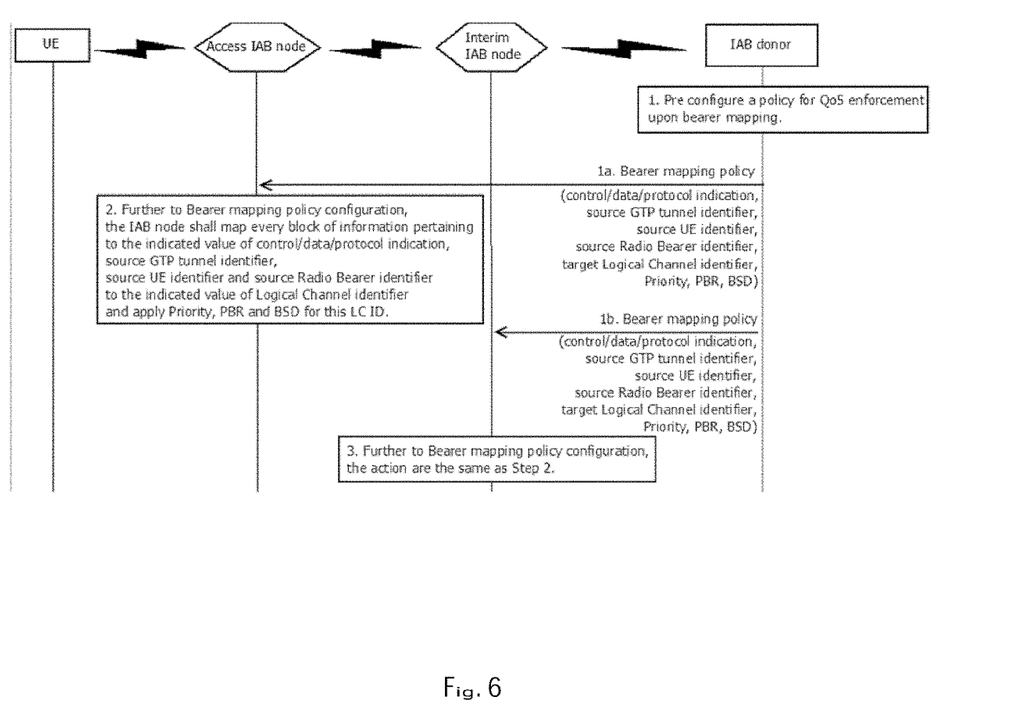
FIG. 6 shows implementation of bearer mapping according to the invention.

Referring to FIG. 6, an embodiment of the bearer mapping of the invention is shown. The IAB network is made up of an IAB donor and two IAB nodes: the access IAB node, towards the UE, and an interim IAB node. The downlink communication path is from the IAB donor node, via the interim IAB node, via the access IAB node to the UE. The uplink communication path is from the UE, via the access IAB node, via the interim IAB node to the IAB donor node.

Steps 1 to 3 describe pre-configuration of the nodes with the bearer mapping policy of the invention. Steps 4 to 6a describe user data transport on a user plane. Steps 7 to 9a describe control data transport on a control plane. Steps 10 to 12a describe use of a transport protocol (e.g. PPP). The illustrated data transport is downlink however the invention applies similarly for uplink communication.

The bearer mapping of the invention avoid the impacts on logical channel identity space of the prior art bearer mapping options.

The nodes of the IAB network may be any of an IAB node, such as an interim IAB node or an access IAB node, and an IAB donor node.

Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally 45 referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory. In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices.

Thus, the elements and components of an embodiment of the invention may be physically, functionally and logically implemented in any suitable way. Indeed, the functionality may be implemented in a single unit, in a plurality of units or as part of other functional units. Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

The invention claimed is:

1. A method of bearer mapping in a wireless communications network, the wireless communications network comprising a plurality of nodes which support integrated wireless access and backhaul between a core network and user equipment, the method comprising at least one of the nodes of the network:

preconfiguring the node with a bearer mapping policy by modifying a protocol layer of the node to define a plurality of sets of permitted values of communication identifiers and associate each set of values of the communication identifiers with a logical channel identifier and at least one quality of service (QoS) parameter for Third Generation Partnership Project (3GPP) New Radio (NR), wherein the QoS parameter comprises any of a Prioritized Bit Rate parameter or a Bucket Size Duration parameter, and receiving at least one signal at the node comprising a plurality of protocol data units, applying the bearer mapping policy to determine the logical channel identifier and the at least one quality of service parameter associated with one of the protocol data units and mapping one of the protocol data units to a logical channel having the logical channel identifier and applying the at least one quality of service parameter to the logical channel; wherein the communication identifiers comprise a communication type identifier signifying a control data communication or a user data communication, a protocol identifier signifying a protocol of the communication, and a General Packet Radio Service Tunneling protocol (GTP) tunnel identifier signifying a tunnel endpoint in a receiving GTP protocol entity.

2. The method according to claim 1 wherein preconfiguring the node is controlled by a donor node of the network.

3. The method according to claim 1 wherein modifying the protocol layer of the node comprises modifying a Radio Link Control (RLC) adaptation layer of the node.

4. The method according to claim 1, wherein the communication identifiers are aggregated to reduce overhead.

5. The method according to claim 1, wherein determining the set of values of the communication identifiers from the protocol data unit comprises reading the set of values of the communication identifiers from a header of the protocol data unit.

6. An integrated access and backhaul (IAB) node configured to perform the method of claim 1.

7. The IAB node according to claim 6 comprising any of an interim IAB node, an access IAB node.

8. The IAB donor node configured to perform the method of claim 1.

* * * * *